United States Patent [19]

Langevin

[11] 4,014,397
[45] Mar. 29, 1977

[54] ELECTRICAL COUNTING SCALE
[76] Inventor: Donald R. Langevin, 3117 SE. 19th Ave., Cape Coral, Fla. 33904
[22] Filed: May 7, 1976
[21] Appl. No.: 684,151
[52] U.S. Cl. .................................. 177/200
[51] Int. Cl.$^2$ ............................... G01G 19/00
[58] Field of Search ............ 177/25, 172, 199, 200
[56] References Cited
UNITED STATES PATENTS

| | | | |
|---|---|---|---|
| 1,994,512 | 3/1935 | Gilbert et al. | 177/200 |
| 2,250,294 | 7/1941 | Carliss | 177/200 |
| 2,484,324 | 10/1949 | Thorsson | 177/200 |
| 3,055,585 | 9/1962 | Boll et al. | 177/200 UX |
| 3,404,744 | 10/1968 | Williams | 177/200 |
| 3,494,437 | 2/1970 | Fathauer | 177/200 |
| 3,552,511 | 1/1971 | Marcheso et al. | 177/200 X |
| 3,557,891 | 1/1971 | Klopfenstein | 177/200 X |
| 3,716,706 | 2/1973 | Gray | 177/200 X |
| 3,789,202 | 1/1974 | Yamanaka | 177/25 X |
| 3,916,173 | 10/1975 | Williams, Jr. et al. | 177/200 UX |

FOREIGN PATENTS OR APPLICATIONS 561,361  5/1944  United Kingdom .............. 177/200

Primary Examiner—George H. Miller, Jr.
Attorney, Agent, or Firm—Duckworth, Hobby, Orman, Allen & Pettis

[57] ABSTRACT

An electrical counting scale of the type having a sample pan for receiving a known number of pieces of like weight, a commodity receiver for receiving an unknown number of pieces to be counted and a first lever for coupling, in a fixed first ratio, the sample pan to the commodity receiver. The load transducer is coupled to the first lever for generating a load signal representative of a load force thereon, with the load signal being coupled to a load indicating device for displaying a representation thereof. A second lever is coupled between said first lever and said commodity receiver for reducing in a fixed second ratio the primary load force transmitted therebetween. A second commodity receiver is provided for receiving another unknown number of said pieces to be counted. A third lever couples said second commodity receiver to said load transducer for increasing the load force thereon by a fixed third ratio.

14 Claims, 1 Drawing Figure

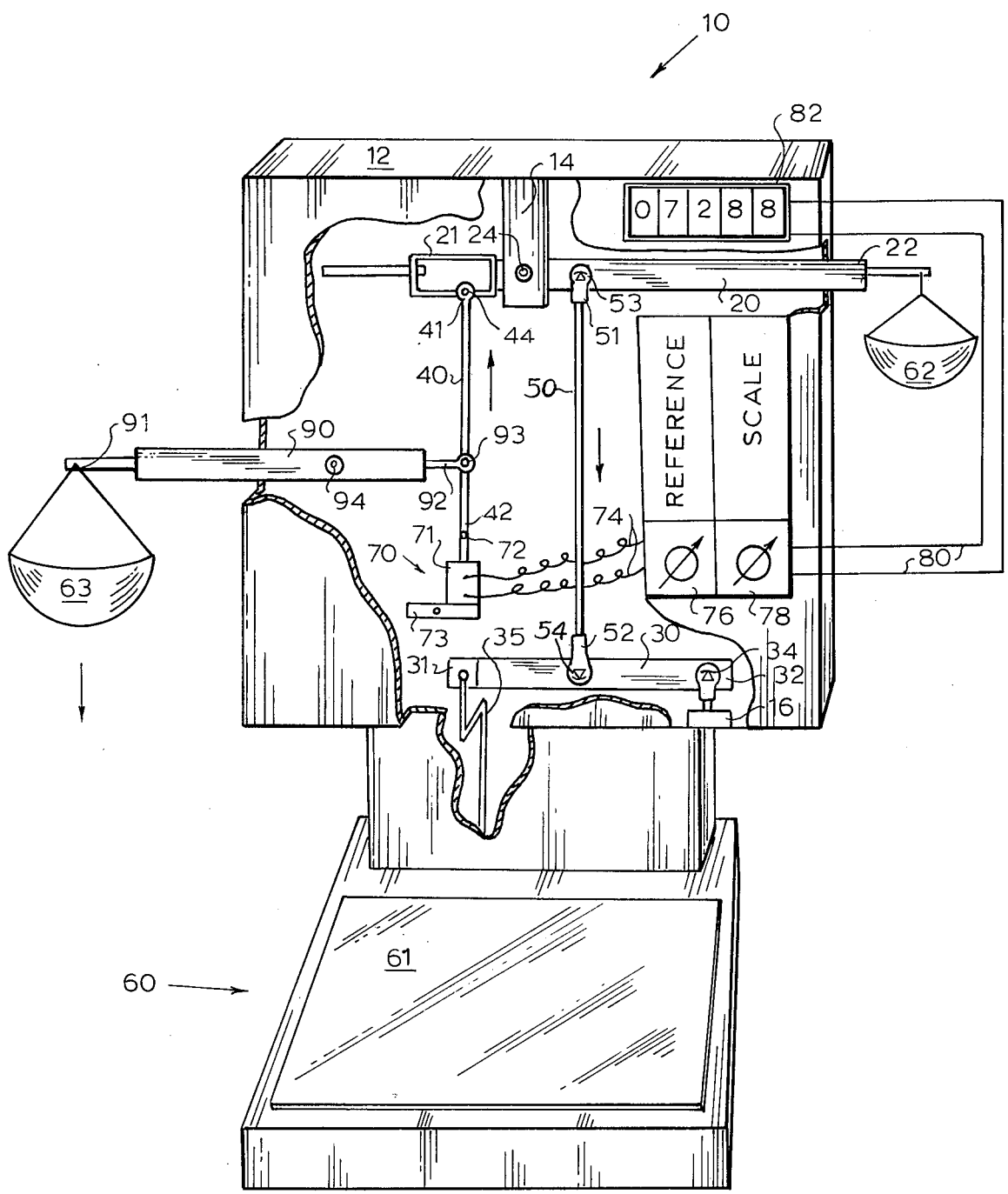

ELECTRICAL COUNTING SCALE

BACKGROUND OF THE INVENTION

1. Field of the Invention

This invention relates to counting scales and more specifically to counting scales having multiple sample receivers utilizing a common electrical load measuring device for measuring the number of the samples and of the unknowns.

2. Description of the Prior Art

Counting scales of the type having a sampling pan and a pan for containing an unknown quantity or weight of a plurality of the same objects contained in the sample pan, are well known in the art. Recent advances in the transducer arts have encouraged many scale designers and manufacturers to incorporate the advantages of an electronic readout in their counting scale designs. The incorporation of an electronic digital readout allows the user of the counting scale to obtain an exact weight or count of the items being weighed without the necessity of interpolating between scale division markings. Also, when wide variations are expected in the weights or numbers of the items being measured, the digital display tends to reduce operator errors in reading and interpolating as compared to a mechanical scale device. Furthermore, it is possible to separate the electronic digital readout from the immediate vicinity of the counting scales when remote readouts are required.

An electrical counting scale is disclosed by Klopfenstein in U.S. Pat. No. 3,557,891. The Klopfenstein counting scale utilizes a single transducer for weighing both a known number of sample pieces of like weight and an unknown number of pieces to be counted. The Klopfenstein counting scale utilizes a differential lever arm length to reduce the mechanical tension forces exerted on the load transducer. Hutchinson, in U.S. Pat. No. 3,667,561, discloses a mechanical scale employing an electronic digital display system and a mechanical leverage structure for reducing the forces exerted on the load transducer. Hutchinson utilizes a spring placed along a distended lever arm for absorbing a large proportion of the load forces exerted upon the load transducer by the load lever system.

Other counting scales employing electronic digital display means are disclosed by Davies et al. in U.S. Pat. No. 3,712,394; Merriam in U.S. Pat. No. 3,561,554; Fathauer in U.S. Pat. No. 3,494,437; Yamanaka in U.S. Pat. No. 3,789,202 and Golding in U.S. Pat. No. 2,918,270. Other weighing devices employing electronic means are disclosed by Ballard in U.S. Pat. No. 2,767,974; Horst et al. in U.S. Pat. No. 2,767,975; Chyo in U.S. Pat. No. 3,047,083; Williams in U.S. Pat. No. 2,918,269 and Howe in U.S. Pat. No. 2,467,752.

SUMMARY OF THE INVENTION

The present invention comprises an electrical counting scale of the type having a sample pan for receiving a known number of pieces of like weight, a first commodity receiver for receiving an unknown number of pieces to be counted, and a first lever for coupling in a first fixed ratio the sample pan to the first commodity receiver. A load transducer is coupled to the first lever for generating a load signal representative of a load force transmitted thereto by the first lever. A load indicating means is electrically coupled to the load transducer for receiving the load signal and displaying a representation thereof. Load reduction means are coupled between the commodity receiver and the first lever for reducing in a fixed second ratio the primary load force transmitted therebetween.

BRIEF DESCRIPTION OF THE DRAWINGS

Other objects, features and advantages of this invention will be apparent from a study of the written description and the drawing illustrating a frontal perspective view of the electrical counting scale in accordance with the present invention.

BRIEF DESCRIPTION OF THE PREFERRED EMBODIMENT

An electrical counting scale, shown generally as 10 in FIG. 1, includes a first lever arm 20 having a first end 21 and a second end 22 spaced on opposite sides of a first fulcrum 24. The first fulcrum 24 is suspended from a support element 14 attached to a frame 12. A second lever 30 includes a movable first end 31 and a second fixed end 32 having a second fulcrum 34 attached thereto. The second fulcrum 34 is pivotted to a support element 16 attached to the frame 12.

A first commodity receiver 60, is attached at the first end 31 of the second lever 30 by the coupling rod 35. The first commodity receiver 60 is adapted to receive an unknown number of pieces of like weight to be counted. A sample receiver 62 is coupled to the second end 22 of the first lever 20 for receiving therein a known number of pieces of like weight.

A first coupling rod 40 includes a first end 41 which is movably coupled by a pivot 44 to the first end 21 of the first lever 20. A second end 42 of the first coupling rod 40 is coupled to a movable center portion 72 of a load transducer 70. A housing portion 71 of the load transducer 70 is coupled by a fixed mounting 73 to the frame 12. The relative separation between the load transducer elements 71 and 72 is increased longitudinally responsive to a tension load force therebetween, with the load transducer 70 generating a load signal representating that load force. In a first preferred embodiment of the present invention, the load transducer 70 is generally sensitive to only 0.0001 of their capacity which is 0.005 pound for a 50 pound cell. The load signal generated by the load transducer 70 is coupled through circuit wires 74 to the reference adjusting circuitry 76 and the scale adjusting circuitry 78, and through the electrical circuit wires 80 to a digital load indicator 82 for displaying a representation of the load force. The electronic circuitry of elements 76, 78 and 82 are not new in the art, but instead are similar in function and design to those disclosed by Klopfenstein, Hutchinson, Davies and the others as previously described.

A second coupling rod 50 includes a first end 51 which is coupled about a pivot 53 attached to a section of the first lever 20 spaced on the opposite side of the first fulcrum 24 from the first end 21. The first fulcrum is equidistant between pivots 53 and 44. A second end 52 of the second coupling rod 50 is attached by means of a pivot 54 to the second lever 30 at a point located between the first end 31 and the second fulcrum 34. When an unknown number of pieces of like weight are deposited in the commodity receiver 60, the earth's gravitational field acts upon this mass to produce a primary load force upon the coupling rod 35. This primary load force is reduced by the mechanical advantage inherent in the design of the second lever 30. In a first preferred embodiment of the present invention, the fixed second ratio is defined by the operative distance measured along the second lever 30 between the first end 31 and the second fulcrum 34, as compared with the distance between the second fulcrum 34 and the pivot 54 attaching the second coupling 50 to the second lever 30. As illustrated in the figure, the fixed second ratio has been chosen to be 2:1, thereby reducing the load force by a factor of 2 so that the reduced primary load force transmitted through the second coupling rod 50 is only ½ the primary load force exerted upon the first end 31 of the second lever 30. In this manner, the effective operative range for the load transducer 70 has been increased by a factor of two due to the mechanical advantage gained by the operation of the second lever 30.

A third lever 90 is pivotally coupled about a third fulcrum 94 attached to the frame 12. The third lever includes a first end 91, having a second commodity receiver 63 coupled thereto, and a second end 92 thereof which is movably coupled about a pivot 93 to the first coupling rod 40 adjacent a central portion thereof. A third fixed ratio of the third lever 90 is defined by the ratio of the distance as measured along the third lever 90 between the second commodity receiver 63 and the third fulcrum 94, as compared to the distance between the third fulcrum 94 and the pivot 93 for coupling the third lever 90 to the first coupling rod 40. In a first preferred embodiment of the present invention as illustrated in the figure, the third fixed ratio has been chosen to be 2:1. Thus, the mechanical advantage induced by the third lever arm 90 will transform one unit of downward force exerted upon the first end of the third lever 90, that is the force produced by the number of unknown pieces within the second commodity receiver 63, into two units of an upward tensional force exerted by the second end 92 of the third lever 90 upon the coupling rod 40 for being transmitted to the load transducer 70.

If the load transducer 70 has an operative measuring range of 0 to 50 pounds, if the ratio of the first lever arm 20 is fixed at 10:1 and if a 1:1 power platform is utilized as the commodity receiver 60, then the fifty pound load transducer 70 may be utilized to measure maximum unknown weights of up to 5 pounds in the sample receiver 62, a maximum of 25 pounds in the second commodity receiver 63 and a load of 100 pounds in the first commodity receiver 60. Since the typical load cell is sensitive to only 1/10,000 of its maximum capacity, the use of mechanical advantage in the levers for reducing or increasing the load force produced by the unknown number of like pieces to be counted may optimize the accuracy of the counting scale by transforming the primary load force produced by the unknown number of like pieces to more closely approximate the maximum usable operating range of the load transducer 70.

Although the 100 pound capacity may be useful in some specific circumstances, it is generally desirable to employ a scale having accurate measuring capabilities in excess of 100 pounds. Therefore, in the first preferred embodiment of the present invention the first commodity receiver 60 actually comprises a 10:1 power force reducer. This device decreases the load force produced on the coupling rod 35 to 1/10 times the load force exerted upon the commodity tray 61. This 10:1 power force initiator is well known in the art, and therefore the specific details are not shown in the illustration. In this manner a 200 pound force exerted upon the commodity tray 61 would be transferred through the coupling mechanisms to produce a load force of 10 pounds upon the load transducer 70. Of course, one skilled in the art will realize that other load reduction or load increasing leverage elements may be introduced into the present invention for obtaining high accuracy measurements over various load ranges.

The operation of the first preferred embodiment of the present invention will now be illustrated with reference to the drawing. First, the reference adjustment 76 is adjusted to provide a zero reading on the digital display 82 when no load force is present upon the commodity tray 61. Next, a known number of samples of like weight are deposited in the first sample receiver 62. While any convenient number of pieces of like weight may be chosen, it is generally convenient to deposit 10 pieces within the sample receiver 62. If the digital display 82 indicates equal to or greater than 200, then the scale adjustment 78 is varied to obtain a 200 indication and the commodity tray 61 of the first commodity receiver 60 is utilized as the effective commodity receiver. In a similar manner, if the digital display 82 reads greater than 50 but less than 199, then the scale adjustment 78 is adjusted to indicate 50 and the second commodity receiver 63 is utilized as the effective commodity receiver. In a similar manner, if the digital display 82 indicates greater than 10 but less than 49, then the scale adjustment 78 is adjusted to indicate 10 on the digital display 82 and the sample receiver 62 is itself utilized as the commodity receiver. In this manner, the mechanical advantage available through the various sample and commodity receivers is utilized to provide an optimum tension force within the highest accuracy interval of the load transducer 70. For example, if the digital indicator 82 is adjusted to 50 by operation of the scale adjustment 78, then the maximum tuning error of 1 percent will be obtained.

After the digital indicator 82 has been adjusted to the proper reading, that is 10, 50 or 200, the sample pieces of like weight are removed from the sample receiver 62. An unknown number of similar like weight pieces then are deposited in the appropriate commodity receiver 60, 63, or 62. Generally this may be accomplished by depositing the unknown number of samples of like weight in the commodity receiver in incremental groups until the digital display 82 reads the same as the previously chosen level. When this previously chosen level is finally reached, the operator will immediately know that the unknown number of like weight samples within the chosen commodity receiver is related to the number of samples originally placed in the sample receiver 62 by a fixed ratio, with the fixed ratio being determined by the commodity receiver being utilized. For example, if $x$ pieces of like weight are deposited in the sample receiver 62, and the scale adjustment 78 varied to achieve a 200 indication on the digital display 82, then a similar indication will be produced by $200x$ similar pieces of like weight deposited on the commodity tray 61. Similarly, if $x$ pieces of like weight were deposited in the first sample receiver 62, and the scale adjustment 78 were varied to indicate a reading of 50 on the digital readout 82, and then the samples are removed from the first sample receiver 62 and an unknown number of samples of like weight are deposited in the second commodity receiver 63 until the digital readout 82 indicates a 50 reading, then the unknown number of samples of like weight located in the second commodity receiver 63 would be equal to 25x. As illustrated in the previous example, the number indicated on the digital display 82 corresponds relatively to the number of unknown samples of like weight which are deposited in the corresponding one of the commodity receivers times a ratio dependent upon the commodity receivers times a ratio dependent upon the commodity receiver being used.

In another illustrative example, the reference adjustment 76 is initially set to provide a zero indication on the digital readout 82, and then 10 samples of like weight are deposited in the first sample receiver 62 for providing a reading on the digital readout 82 in the range of 50 to 199, then the scale adjustment 78 is varied to provide a 50 indication on the digital readout 82. The known number of sample pieces of like weight are then removed from the sample receiver 62, and an unknown number of like weight pieces is deposited in the second commodity receiver 63 for providing a numerical readout on the digital readout 82. However, if the 10 sample pieces of like weight originally deposited in the first sample receiver 62 cause an indication in the range of 10 to 49 on the digital readout 82, then 40 more of the sample pieces should be added to the sample receiver 62 and the scale adjustment 78 would be varied to obtain a 50 indication on the digital readout 82. Then, the first sample receiver 62 itself is utilized as the commodity receiver for providing a direct indication on the digital readout 82 as to the number of like weight pieces within the sample or commodity receiver 62.

The preferred embodiment of the electronic counting scales has been described as an example of the invention as claimed. However, the present invention should not be limited in its application to the details illustrated in the accompanying drawing and the specification, since this invention may be practiced or constructed in a variety of different embodiments. Also, it must be understood that the terminology and descriptions employed herein are used solely for the purpose of describing the general operation of the preferred embodiment and therefore should not be construed as limitations on the operability of the invention.

I claim:

1. An electrical counting scale comprising in combination:
    a sample receiver for receiving an unknown number of pieces of like weight;
    a first commodity receiver for receiving therein an unknown number of said pieces to be counted representative of a primary load force;
    a first lever pivotted about a first fulcrum for coupling in a first fixed ratio said sample receiver to said first commodity receiver;
    load transducer means coupled to said first lever for generating a load signal representative of a load force transmitted thereto responsive to a rotation of said first lever about said first fulcrum;
    load indicating means electrically coupled to said load transducer for receiving said load signal and displaying a representation thereof;
    load reduction means coupled between said commodity receiver and said first lever for reducing in a fixed second ratio said primary load force transmitted therebetween;
    said load reduction means comprises:
    a second lever pivotably coupled about a second fulcrum and having said first commodity receiver attached thereto; and
    means for coupling said second lever to said first lever for producing a rotation of said first lever about said first fulcrum responsive to said reduced primary load force therebetween.

2. The electrical counting scale as described in claim 1 wherein said first commodity receiver is coupled to a first end of said second lever, with said second fulcrum being located at a second end of said second lever, and with said coupling means being coupled to said second lever between said first commodity receiver and said second fulcrum, whereby said fixed second ratio is defined by the distances measured along said second lever between said first commodity receiver and said second fulcrum and between said load reduction means and said second fulcrum.

3. The electrical counting scale as described in claim 1 further comprising electrical calibrating means, interposed in circuit between said load transducer means and said load indicating means, for referencing and scaling said load indicating means to a reference indication responsive to said known number of pieces being received by said sample receiver.

4. The electrical counting scale as described in claim 1 wherein said load transducer is coupled to a first end of said first lever and said sample receiver is coupled to a second end of said first lever, with said first fulcrum spaced between said first and second ends of said first lever, whereby said fixed first ratio is defined by the distances measured along said first lever between said first fulcrum and said load transducer means and between said first fulcrum and said sample receiver.

5. The electrical counting scale as described in claim 4 wherein said coupling means is attached to said first lever at a point between said first fulcrum and said sample receiver.

6. The electrical counting scale as described in claim 5 wherein said point of attachment of said coupling means to said first lever is spaced from said first fulcrum by a distance equal to the spacing between said load transducer and said first fulcrum as measured along said first lever.

7. The electrical counting scale as described in claim 4 further comprising:
    a second commodity receiver for receiving therein another unknown number of said pieces to be counted representative of another load force; and
    a third lever pivotably coupled about a third fulcrum for coupling in a fixed third ratio said second commodity receiver to said load transducer means.

8. The electrical counting scale as described in claim 7 wherein said fixed third ratio of said third lever provides mechanical advantage for linearly increasing the load force produced on said load transducer by said another load force acting upon said third lever.

9. An electrical counting scale comprising in combination:
    a sample receiver for receiving a known number of pieces of like weight;
    a first commodity receiver for receiving therein an unknown number of said pieces to be counted representative of a primary load force;
    a first lever pivotted about a first fulcrum for coupling in a fixed first ratio said sample receiver to said commodity receiver;

load transducer means coupled to said first lever for generating a load signal representative of a load force transmitted thereto responsive to a rotation of said first lever about a first fulcrum;

load indicating means electrically coupled to said load transducer for receiving said load signal and displaying a representation thereof;

a second commodity receiver for receiving an alternate unknown number of said pieces to be counted; and an auxiliary lever pivotted about an auxiliary fulcrum for coupling in a fixed auxiliary ratio said second commodity receiver to said load transducer, whereby the mass of said unknown number or of said alternate unknown number of pieces may be compared with the mass of said known number of said pieces.

10. The electrical counting scale as described in claim 9 wherein said fixed auxiliary ratio of said auxiliary lever provides mechanical advantage for linearly increasing said load force produced on said load transducer by said alternate unknown number of said pieces within said second commodity receiver.

11. The electrical counting scale as described in claim 10 wherein said auxiliary fulcrum is spaced along said auxiliary lever between a first end thereof and a second end thereof, with said second end having attached thereto said second commodity receiver and said first end being coupled to said load transducer, whereby said another fixed ratio is defined by the distances measured along said auxiliary lever between said auxiliary fulcrum and said second commodity receiver and between said auxiliary fulcrum and said load transducer.

12. The electrical counting scale as described in claim 11 further comprising load reduction means coupled between said first commodity receiver and said first lever for reducing in a fixed second ratio said primary load force transmitted therebetween.

13. The electrical counting scale as described in claim 12 wherein said load reduction means comprises:

a second lever pivotably coupled about a second fulcrum and having said commodity receiver attached thereto; and means for coupling said second lever to said first lever for producing a rotation of said first lever about said first fulcrum responsive to said reduced primary load force therebetween.

14. The electrical counting scale as described in claim 12 further comprising electrical calibrating means, interposed in circuit between said load transducer means and said load indicating means, for referencing and scaling said load indicating means to a reference indication responsive to said known number of pieces being received by said sample receiver.

* * * * *